United States Patent [19]

Yamamoto

[11] Patent Number: 4,530,087
[45] Date of Patent: Jul. 16, 1985

[54] SPACE DIVERSITY RECEIVING SYSTEM FOR MULTI-DIRECTION TIME DIVISION MULTIPLEX COMMUNICATION

[75] Inventor: Kazuhiro Yamamoto, Tokyo, Japan

[73] Assignee: NEC Corporation, Tokyo, Japan

[21] Appl. No.: 494,116

[22] Filed: May 13, 1983

[30] Foreign Application Priority Data

May 21, 1982 [JP] Japan ................................ 57-84953

[51] Int. Cl.[3] ............................................. H04B 7/08
[52] U.S. Cl. ................................... 370/104; 375/40; 375/100; 455/135
[58] Field of Search ................... 375/40, 100; 455/52, 455/133, 134, 135, 140; 370/104; 371/8

[56] References Cited

U.S. PATENT DOCUMENTS 3,963,988  6/1976  Niethammer ........................ 375/40
4,128,809  12/1978  Kage ................................. 375/100

FOREIGN PATENT DOCUMENTS 2319094  10/1974  Fed. Rep. of Germany ...... 455/135

OTHER PUBLICATIONS

Specification Sheet PB 74L5157C.

2GHz Digital Radio Relay System CH1435 IEEE by Yamazaki, Hashimoto, Iwamoto, Yamamoto.
NEC Technical Reports, vol. 34, No. 10, 1981, pp. 67–75.

Primary Examiner—Joseph A. Orsino, Jr.
Attorney, Agent, or Firm—Laff, Whitesel, Conte & Saret

[57] ABSTRACT

A space diversity receiving system for the central station of a multi-direction time division multiplex communication network having a plurality of satellite stations, and one central station. Each satellite station transmits signals to the central station during an assigned time slot. The central station receives burst signals from the satellite stations. A first receiver has a main antenna. A second receiver has a supplementary antenna. Both receivers include a demodulator coupled to the corresponding antenna and a detector for detecting bit errors in the resulting demodulated signals, and for providing error pulses when appropriate. Each satellite station, needing space diversity, has a counter for competitively counting the error pulses from the receivers. A signal switcher responds to the demodulated signals and the counter for selecting a demodulated signal having a lower bit error rate.

4 Claims, 5 Drawing Figures

SPACE DIVERSITY RECEIVING SYSTEM FOR MULTI-DIRECTION TIME DIVISION MULTIPLEX COMMUNICATION

BACKGROUND OF THE INVENTION

The present invention relates to a space diversity system for multi-direction time division multiplex (MD-TDM) terrestrial communication network, comprising a great number of scattered satellite stations and one common central station, and more particularly to a space diversity receiving system for a central station.

In a conventional MD-TDM communication system, time division multiplexed (TDM) signals are simultaneously transmitted to a plurality of satellite stations, in a continuous mode. On the other hand, each satellite station, in synchronism with a clock at the central station, transmits burst signals to the central station in a time slot which is individually assigned thereto. Burst signals from the satellite stations are regularly aligned in a time sequence at the central station, with the result that burst signals from any satellite station can be readily identified and reproduced according to the clock at the central station.

In such an MD-TDM communication system, if the transmission path between the central station and a given satellite station extends over a long distance or shows a worse propagation condition like over a sea, the radio transmission quality requires compensation preferably by the use of space diversity reception.

Meanwhile, as a space diversity system in a two-way communication between two geographically separated stations, there is available a baseband switching system in which signals received from a main and a supplementary antennas are separately demodulated. The demodulated signal having a lower bit error rate is selected. For details on this space diversity reception system, reference is made to Yamazaki, et al., "2 GHz Digital Radio-Relay System", IEEE International Conference on Communication, Vol. 1, pp. 5.5.1–5.5.5, 1979.

However, this baseband switching system has a disadvantage. If it is directly applied to the aforementioned MD-TDM communication system, it will be impossible at the central station which receives signals from a plurality of satellite stations to separately monitor and control the channel conditions for each satellite station. Accordingly, no sufficient space diversity effect can be achieved.

SUMMARY OF THE INVENTION

An object of the present invention, therefore, is to provide a superior space diversity receiving system, free from the above-stated disadvantages. Another object is to provide the central station in such an MD-TDM communication network.

The invention is characterized by separately monitoring the bit error rate of demodulated signals for each satellite station, to select the channel having a lower bit error rate.

BRIEF DESCRIPTION OF THE DRAWINGS

Other advantages and features of the invention will be more apparent from the detailed description hereunder taken in conjunction with the accompanying drawings, wherein.

DETAILED DESCRIPTION OF THE INVENTION

Figure 1:
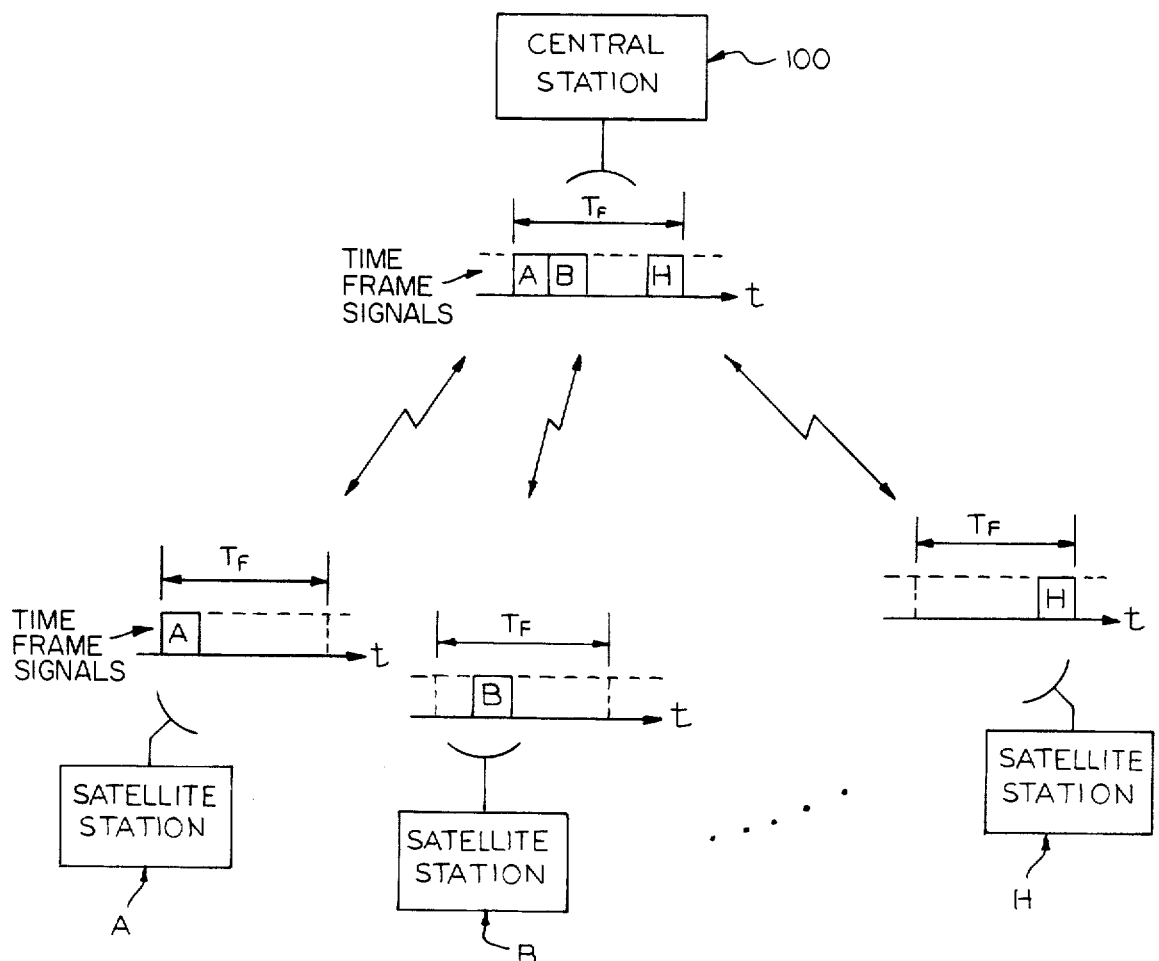
FIG. 1 is a diagram, conceptually illustrating the MD-TDM communication system to which the invention is applicable.

FIG. 1 shows the MD-TDM communication system to which the present invention is applicable. Time division multiplexed (TDM) signals, for example, phase shift keying (PSK) signals, are simultaneously transmitted in a continuous mode to a plurality of satellite stations A, B, . . . and H. On the other hand, each satellite station acts in synchronism with a clock at the central station, and transmits burst signals to the central station in a time slot which is individually assigned thereto. Burst signals from the satellite stations are regularly aligned in a time sequence at the central station. The result is that the burst signals can be readily identified and reproduced according to the clock at the central station.

In the MD-TDM communication system, if the transmission path between the central station and any given satellite station extends over a long distance or shows a worse propagation condition like over a sea, the radio transmission quality will have to be improved by applying the space diversity technique.

For details on the MD-TDM communication system, reference is made to U.S. Pat. No. 4,330,859, assigned to the assignee of the present invention and patented on May 18, 1982, and further to a published article by Nagasawa, et al., "2 GHz Band MD-TDM Communication System" (in Japanese), NEC Technical Report, Vol. 34, No. 10, pp. 67–75, 1981.

Figure 2:
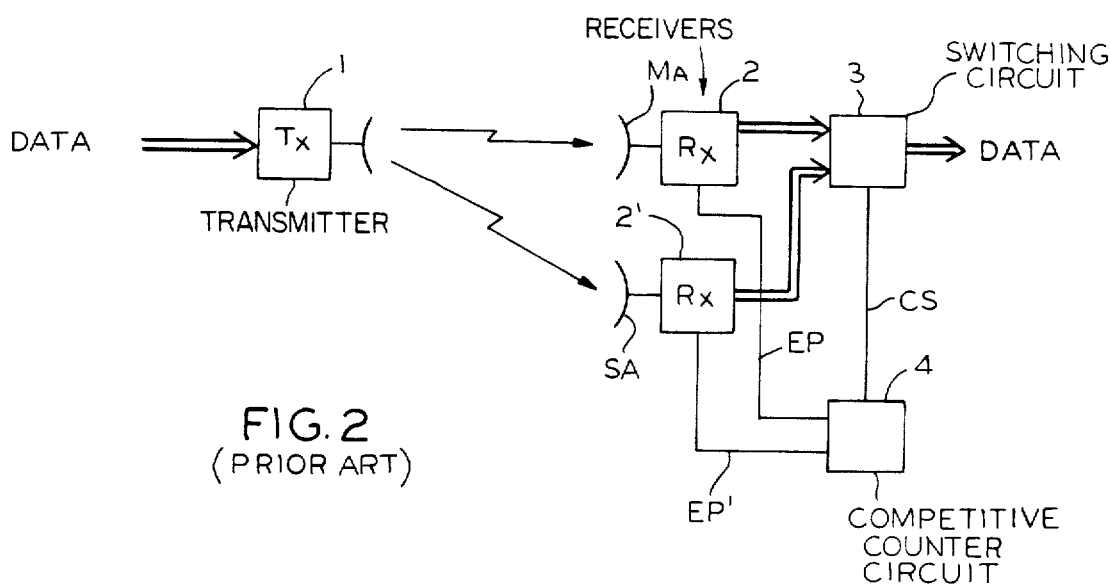
FIG. 2 illustrates a conventional space diversity system.

Meanwhile, as a space diversity reception system for a two-way communication between two geographically separated stations, there is available a baseband switching system. As illustrated in FIG. 2, signals received by a main antenna MA and a supplementary antenna SA are separately demodulated. The demodulated signal having a lower bit error rate is selected. Referring now to FIG. 2, illustrating this available switching system, a data signal DATA is transmitted from a transmitter 1 and is picked up by the main antenna MA and the supplementary antenna SA. Both antennas supply the signals to their individually associated receivers 2 and 2', which give demodulated signals as their outputs, and detect any bit errors that may be contained in the demodulated signals. Receivers 2, 2' supply error pulses EP and EP' responsive to the detected errors. A signal switching circuit 3 (for instance, Data Selector μpB74LS-157C, manufactured and marketed by NEC Corporation) switches baseband signals demodulated by the receivers 2 and 2'. In response to the error pulses EP and EP' from the two receivers 2 and 2', a competitive counter circuit 4 generates a switching control signal CS so that the signal switching circuit 3 can select the demodulated signal having the lower bit error rate.

However, this baseband switching system has a disadvantage. If it is directly applied to the aforementioned MD-TDM communication system, it will be impossible at the central station which receives signals from a plurality of satellite stations to separately monitor and control the channel conditions for each satellite station. Accordingly, no sufficient space diversity effect can be achieved.

Figure 3:
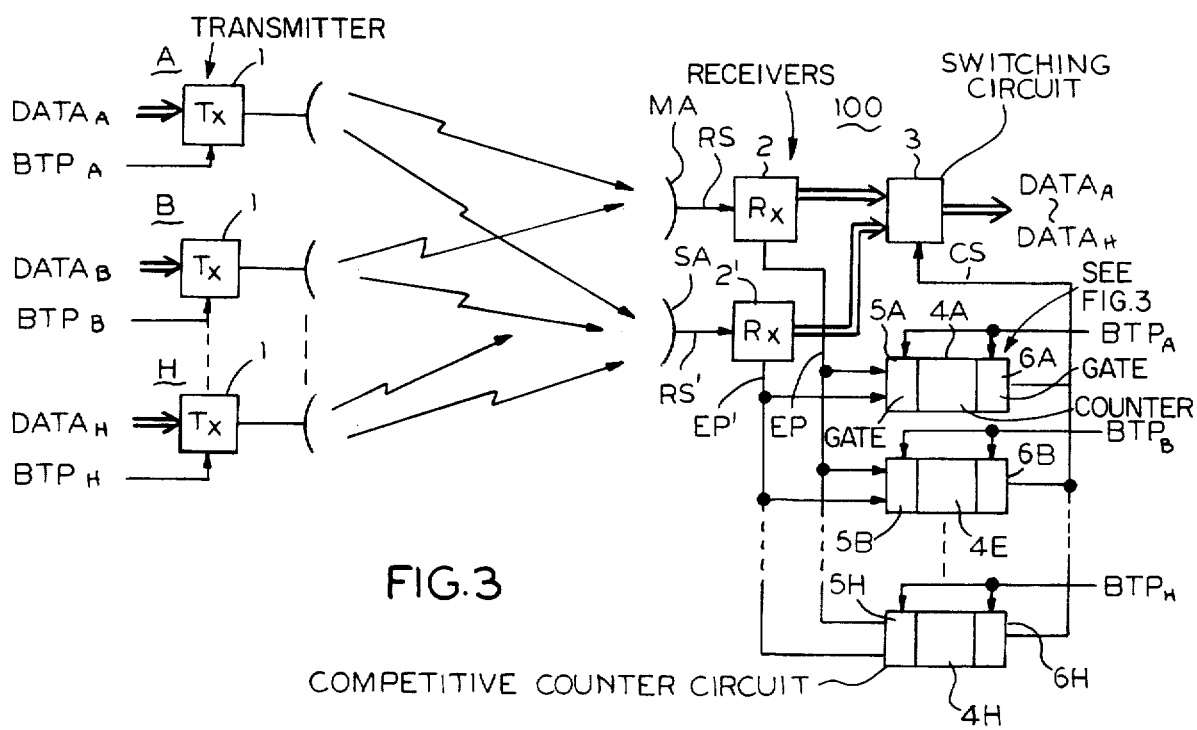
FIG. 3 illustrates one preferred embodiment of an MD-TDM communication system according to the invention.

FIG. 3 illustrates the space diversity system according to the present invention, which is free from the above-stated disadvantage. Each of the satellite stations A to H has a transmitter 1 for transmitting to a central station 100 data signals $DATA_A$ to $DATA_H$ in a burst manner in response to burst timing pulses $BTP_A$ to $BTP_H$, respectively.

The central station 100 receives the burst signals from the satellite stations A to H. The central station 100 (FIG. 3) uses the same reference numerals, as in FIG. 2, to represent respectively the same functions. Blocks 4A to 4H designate competitive counter circuits for the satellite stations A to H. Blocks 5A to 5H are first gate circuits for gating according to the burst timing pulses $BTP_A$ to $BTP_H$ so that the error pulses EP and EP' from the receivers 2 and 2' are supplied to the competitive counter circuits 4A to 4H, and are counted only during the time slots $TS_A$ to $TS_H$ in which signals from the corresponding satellite stations A to H are received. Blocks 6A to 6H are second gate circuits having control inputs CS, which are controlled by the outputs of the competitive counter circuits 4A to 4H to control the signal switching circuit 3. Together, each of the A-blocks (4A, 5A, 6A) constitute a control means which is individually associated with the outlying A station. Likewise, the B-blocks and the H-blocks constitute a control means associated with outlying station B and H, respectively.

The signals on wire CS are supplied only during the respective time slots $TS_A$ to $TS_H$. The burst timing pulses $BTP_A$ to $BTP_H$ respectively correspond to the satellite stations A to H and are supplied by a timing generator circuit (not illustrated) in a signal processing circuit of the central station 100, which is the master of timing signals.

In this arrangement, a burst signal from the satellite station A, for example, is received by the main antenna MA and the supplementary antenna SA and is demodulated by the receivers 2 and 2'. Meanwhile, the error pulses EP and EP' from the receivers 2 and 2', respectively, are supplied to and counted by the competitive counter 4A during only the burst time slot $TS_A$. This competitive counter 4A is controlled to enable the signal switching circuit 3 to select the side (i.e. receiver 2 or 2') which has the lowest bit error rate. When the burst time slot $TS_A$ is over, the competitive counter 4A stands by. It reactivates its function by opening the gates 5A and 6A when the burst time slot $TS_A$ arrives again. Similarly, for the stations B to H which also require diversity, the competitive counter circuits 4B to 4H are operated to switch the baseband signals for the respective stations. The central station 100 need not have competitive counters for other satellite stations which do not require diversity. The central station 100 consistently selects demodulated signals from either receiver from each such station.

FIG. 3 illustrates the transmitting systems of the satellite stations A to H and the diversity receiving system of the central station 100. The conventional diversity system illustrated in FIG. 2 can be applied to the receiving systems of the satellite stations and the transmitting system of the central station because the former receive signals in a continuous mode. In this way, a two-way diversity system can also be established between the central station and each satellite station needing space diversity.

Figure 4:
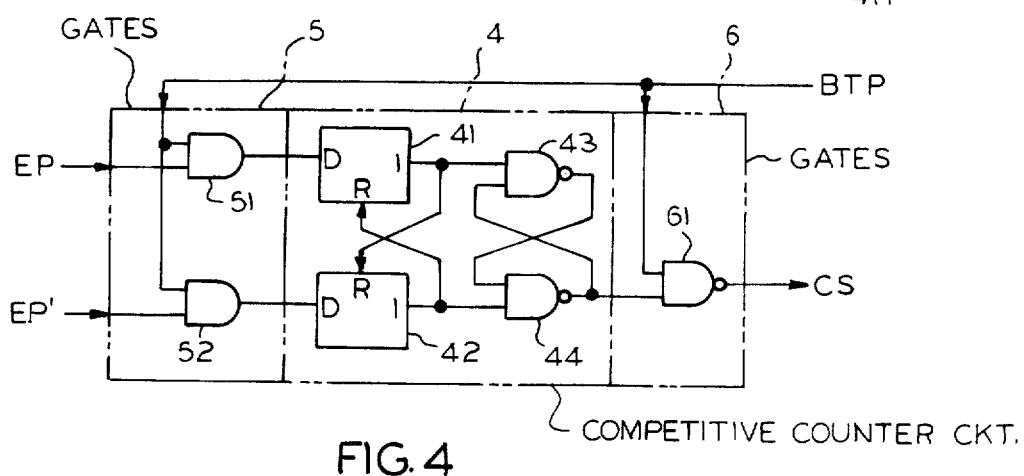
FIG. 4 is a circuit diagram illustrating a specific example of the composition of a competitive counter circuit and gate circuits in FIG. 3.

FIG. 4 illustrates a specific example of the composition of the gate circuits 5 (5A to 5H) and 6 (6A to 6H) and of the competitive counter circuits 4 (4A to 4H). Each of the gate circuits 5 consists of AND gates 51 and 52, and each of the gate circuits 6 consists of a NAND gate 61. Each of the competitive counter circuits 4 comprises N-bit counters 41 and 42 and NAND gates 43 and 44, where N is appropriately determined, with the time taken for detection until the switching is taken into account.

Figure 5:
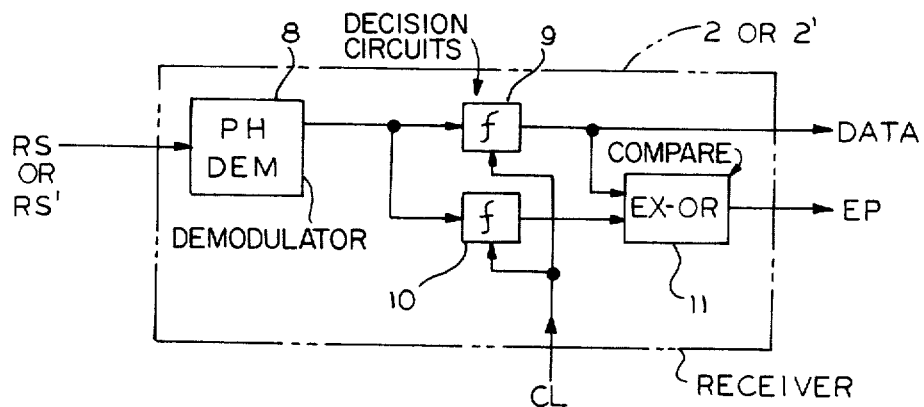
FIG. 5 is a circuit diagram showing a specific example of the composition of a receiver in FIG. 3.

FIG. 5 shows a specific example of the composition of the receiver 2 or 2', which consists of, for example, a multi-phase demodulator circuit 8 responsive to the signal RS or RS' for providing as its output a demodulated signal DATA derived from a burst signal; a main decision circuit 9; and a sub-decision circuit 10 whose bit error rate is intentionally deteriorated; a comparator 11 for generating the error pulse EP or EP'. The circuits 9 and 10 detect the level of the demodulated signal in response to a clock pulse CL from a clock generator (not shown). When the error rate begins to deteriorate, the output of the circuit 10 begins to be erroneous, and an error pulse emerges in the output of the comparator 11, so that switching can be achieved in anticipation of the deterioration of the channel quality. Details of this circuitry are disclosed in, for example, the U.S. Pat. No. 4,188,618, assigned to the present assignee and granted on Feb. 12, 1980.

As herein described, the present invention enables the central station of an MD-TDM communication system receiving burst signals to be equipped with a baseband switching type space diversity receiving system permitting separate control for each satellite station. This makes it possible to introduce MD-TDM communication systems even in areas where the conditions of propagation are adverse, such as where signals have to be transmitted over the sea surface.

What is claimed is:

1. A space diversity system for a central station of a multi-direction time division multiplex communication network comprising a plurality of satellite stations and one central station, in which each satellite station transmits signals to said central station in a time slot which is individually assigned thereto and said central station receives burst signals from said satellite stations, said central station comprising:

a first receiver means having a main antenna;

a second receiver means having a supplementary antenna, each of said first and second receiver means including demodulator means for demodulating input signals from the corresponding antenna and detector means for producing error pulses responsive to detection of bit errors in the demodulated signals;

counter means individually associated with each satellite station needing space diversity, for competitively counting the error pulses from said first and second receiver means to provide a control signal;

first gate means provided on the input side of each of said counter means for controlling the supplying of said error pulses to said counter means in response to a burst timing signal for identifying each satellite station time slot;

a signal switching means responsive to said demodulated signals and said control signal for selecting and providing as its output the demodulated signal having a lower bit error rate; and second gate means provided on the output side of each of said counter means for controlling the supplying of said control signal to said signal switching means in response to said burst timing signal.

2. A time division multiplex system comprising a plurality of outlying stations and one central station, each of said outlying stations transmitting during individually associated time slots, means for transmitting digital signals over a plurality of transmission paths between said central station and said outlying stations, at least some of said paths having adverse propagation characteristics, duplicate antenna and receiver means at said central station for receiving signals thus transmitted over each of said paths having adverse characteristics, a plurality of control means for detecting and counting bit errors received from each of said duplicate receiver means, each of said control means being individually associated with a corresponding one of said outlying stations, and gate means on opposite sides of each of said control means for selectively gating the signals from the duplicate receivers through said control means, means for selectively operating said gate means during the time slots assigned to the outlying station which is individually associated with control means, and means responsive to said control means for selecting the one of said duplicate receiver means which has the lower number of bit errors.

3. The system of claim 2, wherein said system is a multi-directional time division multiplex network and each of said outlying stations is a satellite station.

4. A time division multiplex system comprising a plurality of outlying stations and one central station, each of said outlying stations transmitting signals in bursts during time slots which are individually associated with corresponding ones of said outlying stations, means for transmitting digital signals over a plurality of transmission paths between said central station and said outlying stations, at least some of said paths having adverse propagation characteristics, duplicate antenna and receiver means at said central station for receiving signals thus transmitted over each of said paths having adverse characteristics, a plurality of control means for detecting and counting bit errors received from each of said duplicate receiver means, each of said control means being individually associated with a corresponding one of said outlying stations, clock means common to all of said stations for selectively identifying each of said stations, gating means individually associated with each of said plurality of said control means for selectively enabling signals from said corresponding one of said outlying stations to pass through said control means, means responsive to said clock means for simultaneously causing an outlying station to transmit said burst signals and for causing said associated gate means to enable said control means to receive said burst signals, and means responsive to said control means for selecting the one of said duplicate receiver means which has the lower number of bit errors.

* * * * *